E. C. NORTHRUP.
WRAPPING MACHINE.
APPLICATION FILED JULY 6, 1908.

980,329.

Patented Jan. 3, 1911.
6 SHEETS—SHEET 2.

E. C. NORTHRUP.
WRAPPING MACHINE.
APPLICATION FILED JULY 6, 1908.

980,329.

Patented Jan. 3, 1911.
6 SHEETS—SHEET 3.

Witnesses:—

Inventor;
Elmer C. Northrup.
by Townsend & Haenley
his Attys

E. C. NORTHRUP.
WRAPPING MACHINE.
APPLICATION FILED JULY 6, 1908.

980,329.

Patented Jan. 3, 1911.
6 SHEETS—SHEET 5.

Witnesses:—

Inventor;
Elmer C. Northrup.
by Townsend Lyon & Hackley
his Attys

E. C. NORTHRUP.
WRAPPING MACHINE.
APPLICATION FILED JULY 6, 1908.

980,329.

Patented Jan. 3, 1911.
6 SHEETS—SHEET 6.

UNITED STATES PATENT OFFICE.

ELMER C. NORTHRUP, OF LOS ANGELES, CALIFORNIA, ASSIGNOR OF ONE-HALF TO JOHN B. FEATHERSTONE, OF LOS ANGELES, CALIFORNIA.

WRAPPING-MACHINE.

980,329.

Specification of Letters Patent.

Patented Jan. 3, 1911.

Application filed July 6, 1908. Serial No. 442,189.

*To all whom it may concern:*

Be it known that I, ELMER C. NORTHRUP, a citizen of the United States, residing at Los Angeles, in the county of Los Angeles and State of California, have invented a new and useful Wrapping-Machine, of which the following is a specification.

This invention relates to wrapping machines, and while it is adapted for wrapping various articles or packages, it is particularly designed for wrapping fruit, such as oranges, lemons, &c.

In wrapping fruit and especially oranges it is very desirable that the fruit be handled in as expeditious a manner as possible and at the same time that it be subjected to careful handling to prevent injury either by abrading the skin or bruising the fruit.

In doing the work by machinery it is necessary that the fruit be delivered to the machine one at a time and that it be delivered at such a time and place as to be properly positioned upon the paper which is adapted to be wrapped around it and closed by pressing the edges together as compactly as possible so as to prevent the accidental loosening and possible loss of the wrapper in subsequent handling of the fruit.

The accompanying drawings illustrate the invention and form a part of the specification.

Fig. 2 is a transverse vertical sectional view showing a roll of paper and the mechanism for severing it into proper lengths to form the wrappers.

Referring more particularly to the drawings which are for illustrative purposes only and, therefore, are not drawn to any particular scale, 1 indicates the base or main frame of the machine upon which the paper mechanism is mounted at or near one end and the wrapping mechanism at or near the other with the conveyer and fruit supply located intermediate the ends.

Journaled transversely of the frame 1 are two shafts 2 and 3 upon which are mounted two sprocket wheels 4 and 5, respectively. A sprocket chain 6 is mounted upon these wheels substantially centrally of the frame which is provided with a series of cup-like holders 7. The sprocket wheels and chain may be driven in any suitable manner, as by means of the gear wheels 8 and 9 and a belt wheel 10. The chain may be of any suitable construction and is formed or provided at suitable distances apart with plate like links 11 upon each of which is located a suitable boss or projection 12. The boss is preferably hollow and a rod or stem 13 projects therethrough and through the plate 11 and has its inner end provided with a head 14 which is adapted to engage with the plate 11 and prevent the rod from being disconnected from the plate. Each rod carries one of the cup-like receptacles 7 at its outer end and is held in its extended or projected position with the head 14 in engagement with the plate 11 by means of a coiled spring 15 which is preferably made tapering with its lower end secured to the plate 11 in any suitable manner and its outer end engaging with the bottom of the receptacle 7.

Figure 10:
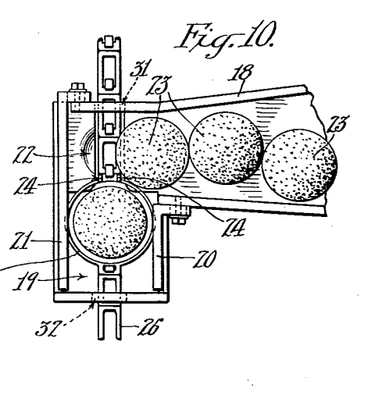
Fig. 10 is a plan view of the delivery end of the feeder.
Figure 11:
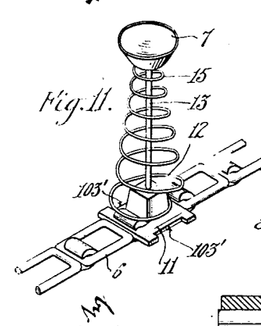
Fig. 11 is a broken perspective of part of the carrier.
Figure 12:
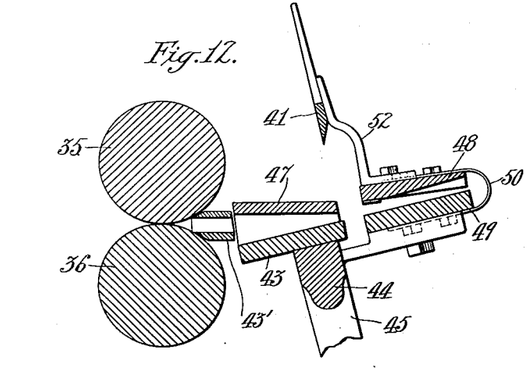
Fig. 12 is an enlarged sectional view of the paper cutting mechanism.
Figure 13:
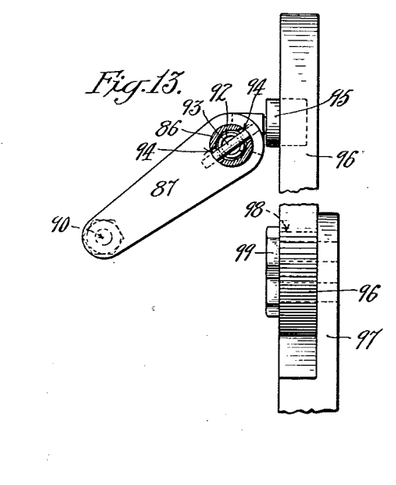
Fig. 13 is a broken plan view of the plunger mechanism.

The shafts 2 and 3 are journaled near the ends of the frame 1 and a plate 16 is supported in any suitable manner, preferably by means of a bracket 17, intermediate the sprocket wheels 4 and 5 with its upper face substantially in alinement with the upper portion of the wheels so as to receive and support the chain 6, and especially the links 11, so as to hold the cups 7 upright when they are receiving and carrying forward the oranges. The oranges are fed to these receptacles in any suitable manner but I prefer to provide an inclined trough 18 which has its inner end located adjacent to the center of the machine, or the path traveled by the receptacles 7, with a discharge gate 19 which is preferably arranged at an angle to said trough as shown in Fig. 10. Two of the sides of the gate 20 and 21 are preferably made adjustable laterally toward and from each other so as to properly position the different sized oranges relatively to the receptacles 7 of the carrier. The bottom of the spout 18 is preferably slightly cupped as shown at 22 to properly position the oranges 23 so as to be engaged by upwardly extending fingers 24 that are secured to or form a part of a series of rim like projections 25 mounted upon a chain 26. The chain 26 is mounted upon sprocket wheels 27 on shafts 28 which are mounted in brackets 29 and 30. The wheels 27 are mounted upon the shafts so as to be directly above or in the same plane with the chain 6 and at such a distance above the path of the receptacles 7 that when the fingers are passed through the lower end of the spout 18 and the gate 19 the oranges are carried from the lower end of the chute or spout 18 into the gate 19 from whence they drop down through the rings 25 into the receptacle. The rear wall of the spout and the front wall of the gate are recessed as shown at 31 and 32, respectively, through which the fingers are adapted to pass. The rings 25 are so positioned upon the chain 26 that one of them will pass under the gate every time that a receptacle 7 on the carrier 6 is directly beneath, thereby providing each receptacle with an orange. To prevent the oranges from being shaken off the receptacle by the rapid movements of the machine the chain 26 is extended a suitable distance lengthwise of the carrier 6 so as to cause the rings 25 to move forward simultaneously with the receptacles 7 and the rear end of the chain is slightly raised or inclined upward so that as the rings 25 are carried forward they are also gradually lifted upward until they pass up around the wheel 27 and the orange goes forward to the wrapping mechanism.

The wrapping machine is adapted to use paper which is preferably provided in the form of a roll 33 which is mounted on standards 34 at the forward end of the machine and one end of the paper is passed down between rolls 35 and 36 which feed it forward to the cutting mechanism at the desired rate of speed. If desired suitable printing mechanism may be provided which is shown in the form of a roller 37 that is supplied with ink from a receptacle 38 by means of rollers 39.

The cutting mechanism for severing the strip of paper into suitable lengths to form the wrappers 40 comprises a blade 41 that is pivotally mounted adjacent to one end as shown at 42 with its cutting edge adapted to be moved down into engagement with or past a plate or support 43 in the usual manner.

The plate 43 is mounted upon a base or support 44 that is mounted or formed upon the upper ends of two rocker arms 45 which are pivoted at their lower ends upon the frame 1 as shown at 46. A shield or cover 47 is secured at its ends to the plate 43 with its intermediate portion at a suitable distance above the plate to form a guide and permit of the passage of the paper from the rolls 35 and 36 to and beyond the knife blade or cutter. The cutting mechanism is preferably provided with another guide which also forms a clamp and is preferably formed by plates or bars 48 and 49 which are yieldingly held together in any suitable manner, as by means of the bow springs 50, one at each end. This additional guide and clamp is connected with the rocker arms in any suitable manner, as by means of two arms or projections 51 which extend from the base or support 44 a suitable distance.

The clamp is normally closed so as to engage with the end of the paper and hold it taut when the knife is being depressed to cut the paper so that if the knife should fail to cut it, as from being dull, the paper will be torn off so as to form a wrapper. A projection 52 extends upwardly from the upper member of the clamp so as to be engaged by the knife when it is raised and thereby open the clamp by raising or tilting said member with the springs at the ends as pivot points. The throat or opening through the guides and clamp is preferably tapered from the side adjacent to the rolls 35 and 36, toward the wrapping mechanism, and a stripper is preferably provided for substantially engaging with the lower roll 36, and preventing the paper from being carried around the roll, as when there is enough dampness to cause it to stick to the roll. This stripper is preferably formed as a separate piece 43' which can be mounted adjacent to said roll in any desired manner.

Figure 4:
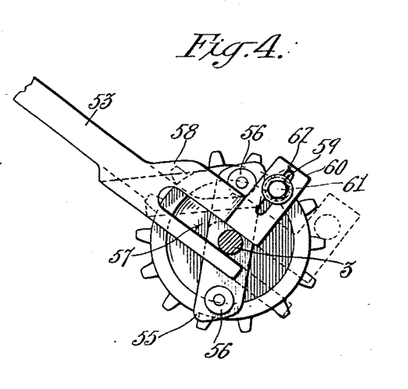

As the operation or movements of the parts of the machine are continuous, or substantially so, it is necessary to move the blade forward as it is cutting the paper, which forward movement is accomplished by means of suitable cam mechanism and a pitman or link 53 leading therefrom to one end of the cutting mechanism where it engages with the outer end of an arm 54, the inner end of said arm being formed upon or bolted to one end of the base 44 as shown in Fig. 2. The cam mechanism comprises a bar 55 which is mounted on the shaft 3 so as to be rotated thereby and having two projections or rollers 56 upon one side. The pitman is slotted as shown at 57 so as to be reciprocally supported by the shaft 3 and it is provided with two shoulders 58 and 59, the shoulder 58 being inclined and the shoulder 59 preferably being in the form of a roller which is adjustably secured to an arm 60 from the pitman by means of a stub axle 61 and slot 62. The shoulder or roller 59 is so located as to be engaged by the cam like ends of the bar 55 when the shaft 3 is rotated in the direction of the arrow and will thereby move the pitman endwise and cause it to swing the cutting mechanism forward until the end of the cam has passed out from under the roller 59 as shown in dotted lines in Fig. 4. By the time the bar 55 and pitman 53 have been moved into this position one of the rollers 56 on the bar will be carried up into position to engage the inclined shoulder 58 and thereby return the pitman and cutter mechanism to their normal positions. Just as the roller 56 passes out of engagement with the upper end of the bar 55 the inclined shoulder 58 the end of the bar 55 is in position for engaging with the roller 59 and will again move the pitman 53 and the cutting mechanism forward as above described. As the cutting mechanism is reciprocally moved back and forth lengthwise of the machine in this manner to correspond with the movement of the paper the heel or outer end of the blade 41 is caused to engage with a cam mechanism so as to swing the blade vertically upon its pivot 42. This cam mechanism preferably comprises a bracket 63 that is mounted upon one of the standards 34 and is provided with a vertically arranged side or plate 64.

Figure 3:
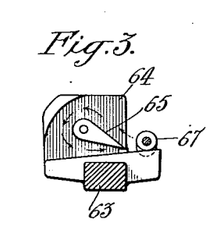
Figs. 3 and 4 are detail views relating thereto.
Figure 9:
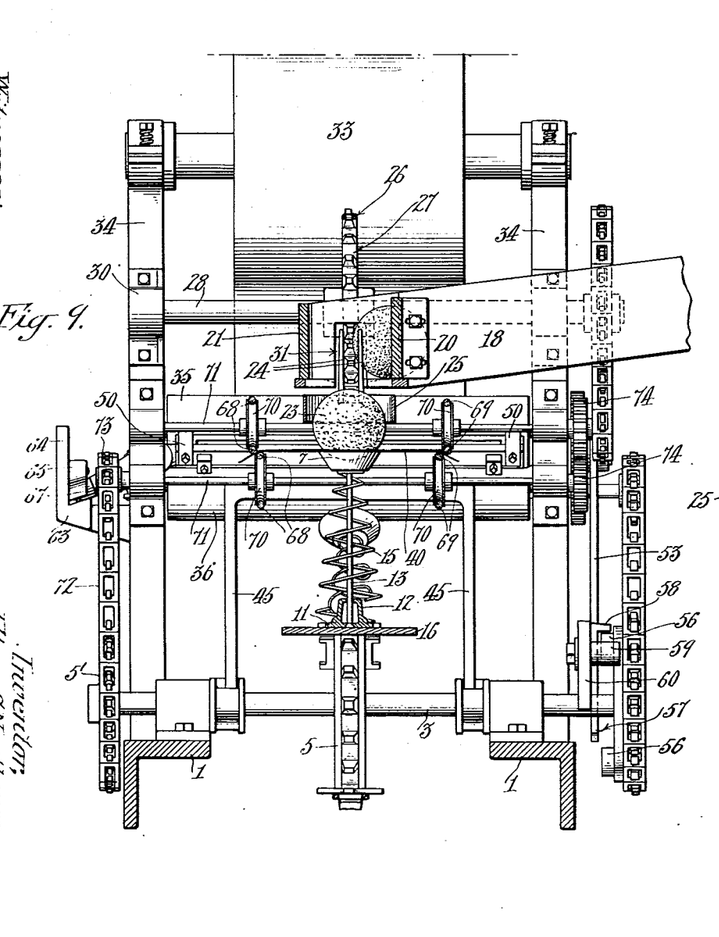
Fig. 9 is a vertical transverse sectional view showing the means of feeding the fruit to the machine.

A latch 65 is pivotally mounted upon the side 64 in such position that it will ride over the outer end or heel of the cutter and thereby permit the cutter to remain in its elevated or open position while the cutting mechanism is being returned preparatory to cutting off another wrapper. But as soon as the forward movement of the cutting mechanism begins the heel of the blade will engage with the latch 65 and be caused to ride up over it as shown by the dotted arrows in Fig. 3 which will cause the inner or cutting end of the blade to descend into engagement with the edge of the plate 43 and thereby cut off enough paper to form a wrapper 40 as the cutting mechanism is carried forward. The blade is held in its elevated or inoperative position by the spring 66 and the end of its heel is preferably provided with an anti-friction roller 67. After the paper has been cut into wrappers in this manner it is delivered to a carrier which preferably comprises two pairs of endless bands 68 and 69 that are adapted to be actuated by sets of grooved wheels 70 mounted respectively upon pairs of shafts 71, one of said shafts being driven from a sprocket wheel 5' by a sprocket chain 72 and sprocket wheel 73 at one end and the two shafts being provided with intermeshing gearing 74 at the other end. The wheels 70 upon one of the shafts 71 are mounted at a greater distance apart than the other wheels upon the other shaft so that the faces or operative portions of the respective belts 68 and 69 will not be in the same plane but will overlap or extend past each other as shown in Fig. 9 and will thereby clamp the edges of the wrappers 40 between them and hold the wrappers taut and smooth.

The movements of the mechanism so far described are timed to cause a wrapper 40 to be deposited upon each succeeding receptacle 7 just before the latter reaches the gate of the supply chute so that as the receptacle passes under said gate an orange will be dropped upon the wrapper which will slightly fold the wrapper into the cup with its edges projecting substantially horizontally and the orange and wrapper will then be carried forward to the wrapping mechanism at which place the operation of folding the wrapper around the orange and crimping its edges together will be completed. But the grippage between the bands is not sufficient to tear the paper before it is cut off from the roll to form a wrapper.

The folding and wrapping mechanism comprises oppositely located reciprocally mounted blades or folders 75. These folders have their inner ends formed as diverging fingers 76, shown more particularly in Fig. 5, which are of such size that when they are opened to their fullest extent with their tips just overlapping the orange and its wrapper can be passed down through the opening formed thereby. There are preferably two pairs of these folders suitably spaced apart by means of plates or blades 77, as to permit of the fingers interlocking, and they are preferably slightly curved transversely as shown in Fig. 1, and longitudinally as shown in Fig. 6, and are sufficiently rigid to cause them to substantially retain this curvature as they are moved back and forth to compress the edges of the paper at the top of the orange.

The folders are adjustable by means of slots 78 and bolts 79, two of said bolts each engaging with the outer ends of the folders to prevent possible outward movement.

Figure 1:
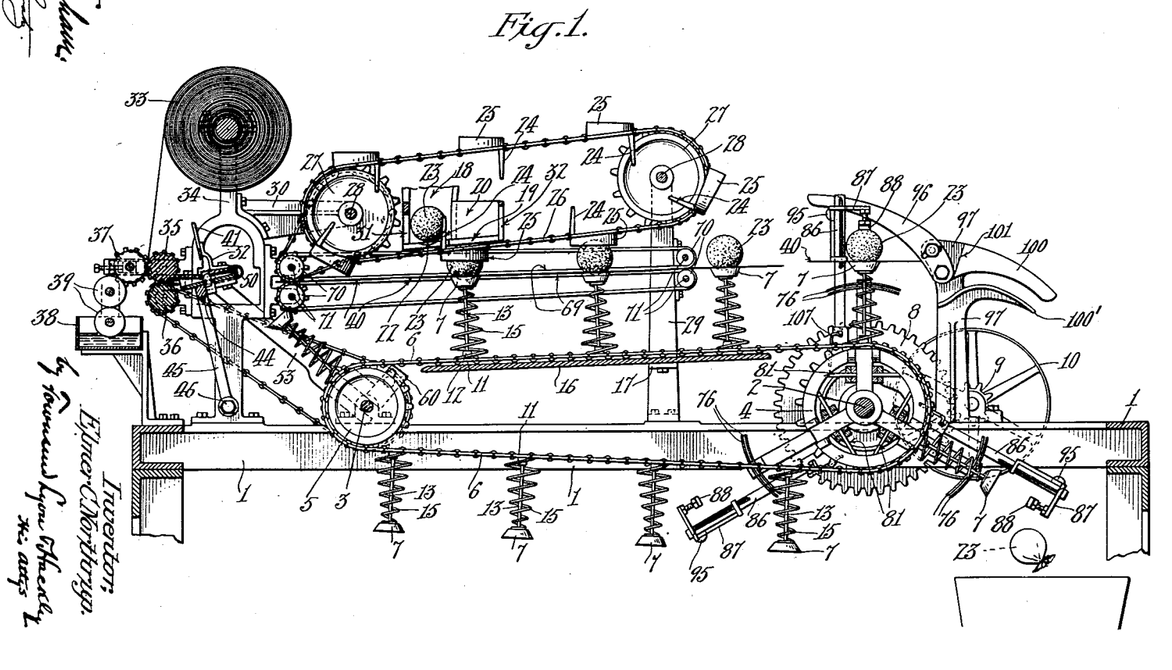
Figure 1 is a vertical longitudinal sectional view of one form of machine embodying the invention.

The folders are carried upon the outer ends of arms 80 which are pivotally mounted upon the spokes of the wheel 4 by means of pins 81 which extend from the respective spokes to the periphery of the wheel as shown in Fig. 1. Each arm is provided near its pivot point with a projection, preferably in the form of a roller 81', which is adapted to engage with a fixed or stationary cam 82 as the wheel is revolved. The cams 82 are preferably integral with the bearings 83 of the shaft 2 and are so formed that as the wheel 4 rotates the cams will cause the folders to be closed in over the orange and thereby crimp the edges of the paper together and hold it a sufficient length of time to permit the paper to become set, after which they will be opened and permit the orange to be discharged.

Figure 5:
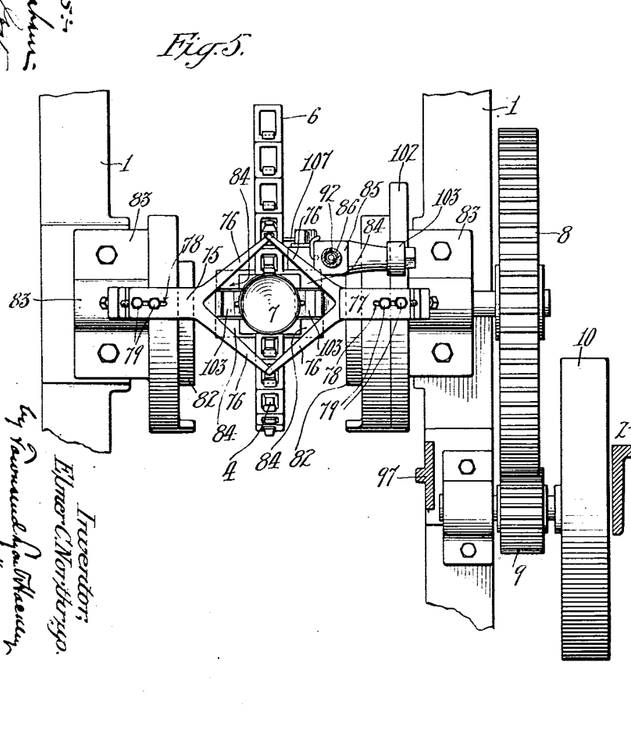
Fig. 5 is a broken top plan view, partly in section, of the wrapping mechanism.
Figure 6:
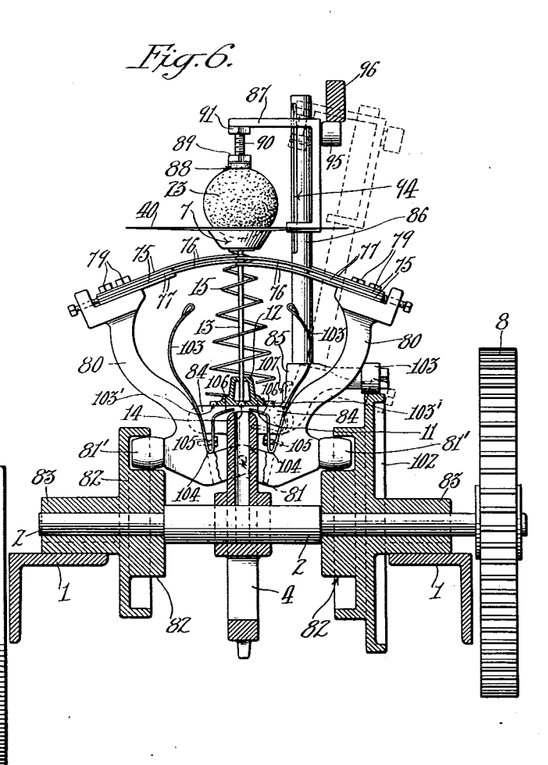
Fig. 6 is a vertical transverse sectional view of said mechanism showing the position the parts occupy at the beginning of the wrapping process.

The portion of the arms adjacent to the pivot point are adapted to be seated between pairs of ears 84 upon the sides of the wheel 4 and the base piece 85 of the presser mechanism is pivotally mounted upon one of the ears as shown more particularly in Fig. 5. Secured to the base 85 is a hollow post or stem 86 that projects outwardly substantially radially of the wheel 4 and is provided at its outer end with a reciprocatory frame 87. One of the arms of the frame 87 is longer than the other and is provided with means for engaging with the orange and forcing it down between the fingers of the folders 75 before they have been entirely closed in. This mechanism preferably consists of a pad 88 of yielding material mounted upon a base 89 that is adjustably secured to the longer arm of the frame by a screw threaded stem or plunger 90 and a nut 91.

The frame 87 is normally held outward upon the stem 86 by means of a spring 92 that is seated in a hollow of the stem and engages at its outer end with a pin 93 that extends through the frame 87 and projects through slots 94 formed in the sides of the stem. The frame is provided with a roller 95 which is adapted to be moved into engagement with a presser arm 96 as the wheel 4 is rotated. The arm 96 is secured to the upper end of a standard 97 that projects upwardly from the frame 1 and is preferably made pivotally adjustable by means of a slot 98 and bolt 99. The upper end of the standard 97 is preferably provided with a hook like extension 100 that is shouldered as shown at 101 so as to occupy the same plane with the arm 96 so as to be engaged by the roller 95 after the roller passes down under the lower end of the arm 96 and is forced outward by the spring 92. In this manner the frame is prevented from being driven outward with such force and rapidity as to damage the parts of the machine or prevent their properly performing their functions.

The outer ends of the stem 86 and the frame 87 are adapted to be moved back and forth as shown by dotted lines in Fig. 6 by a cam 102, a roller 103 that is mounted on the base 85 and a spring 107 that normally holds the roller in engagement with the cam.

Figure 14:
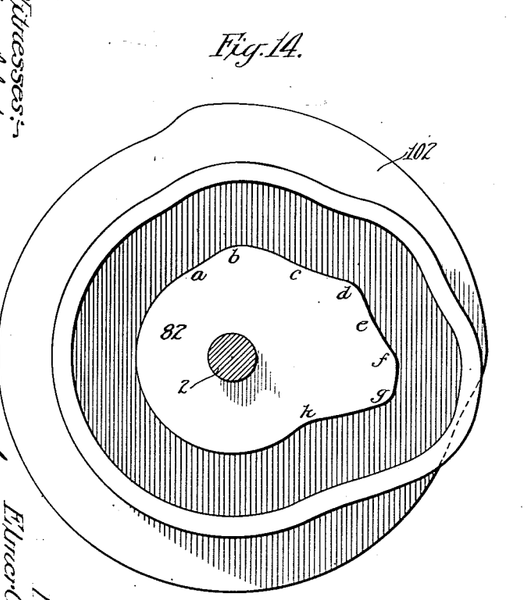
Fig. 14 is a face view of one of the cams.

The cams 82 are so formed, see Fig. 14, that as the rollers 81 pass from $a$ to $b$ the folders will be partly closed so as to cause the wrapper to be folded up around the orange as it is forced down between the fingers 76, by the plunger or frame 87, then as they pass from $b$ to $c$ the folders will be held stationary while the fruit is being forced down between the folders, then as they pass from $c$ to $d$ the folders will be nearly closed, sufficient room only being left for the presser or plunger that forced the orange down to be withdrawn, then as they pass from $d$ to $e$ the folders will be held stationary while the plunger is being withdrawn, then as they pass from $e$ to $f$ the folders will be closed entirely, and held so while the cams pass from $f$ to $g$ to permit the paper to become set in its crimped condition, then as they pass from $g$ to $h$ the folders are quickly separated or opened so as to permit the orange to be ejected by the expansion of the spring 15 which has been compressed by the descent of the frame 87.

Figure 7:
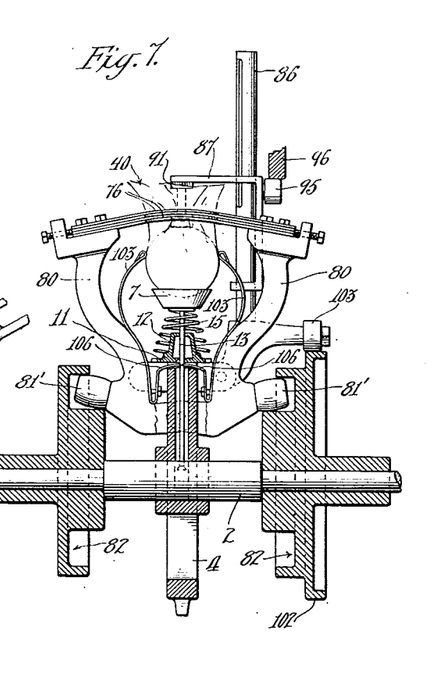
Fig. 7 is a similar view showing the process partly completed.
Figure 8:
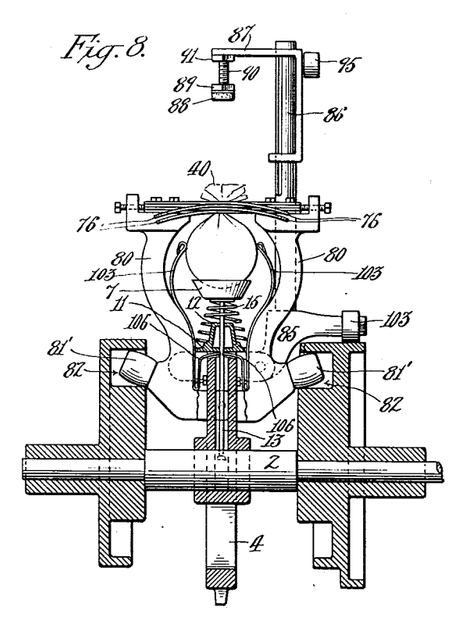
Fig. 8 shows the position of the parts when the process has been completed.

Located upon the inner face of each of the arms 80 is a spring finger 103$^a$ preferably formed from a flexible strip of metal having its upper end adapted to be forced into engagement with the wrapper when the arms are moved inward to close the folders as shown in Figs. 7 and 8, and thereby assist in the operation of wrapping the orange. The lower end of each finger is folded upon itself substantially V-shaped, as shown at 104, with the inner end of the folded portions of the two springs adapted to be forced into engagement with the stem 13 after the stem has been depressed or forced into a spoke of the wheel 4, to its fullest extent, the spokes of the wheel being made hollow for that purpose, as shown in Figs. 7 and 8, and thereby hold the stem by frictional contact against outward movement. A screw 105 is passed through the folded portion of each finger into the base of the arm 80 so as to hold the finger in position and adjust the tension of said end with the stem 13, and the other or longer arm of the V is adapted to fit within recesses 103' on the sides of the plates 16 of the chain 6.

In using a machine as above described a roll of paper is mounted at the forward end of the machine and a supply of oranges is fed through the supply spout and power from any suitable source is applied through the belt wheel 10. As the parts revolve the paper is fed forward and cut into suitable lengths to form wrappers for the oranges and one wrapper is placed upon each orange receptacle as said receptacles move forward. As the receptacles pass under the supply mechanism each one is provided with an orange which is carried forward until it stands directly under the pad 88 of the plunger or presser frame 87, which pad and frame are then caused to descend by the engagement of the roller 95 with the upper end of the arm 96, the folders having been partly closed by the rollers 81 passing from $a$ to $b$ on the cams 82 as heretofore described. As the receptacle and orange continue their forward movement the frame 87 is also carried forward and gradually forced downward by the arm 96 until the orange has been carried down below the folding fingers 76. While the parts occupy this position the arms 80 are gradually forced inward by the rollers 81 passing from c to d on the cams 82, until the fingers are nearly closed at which time the inner ends 106 of the spring fingers 103 will engage with the stem 13 with sufficient pressure to hold it against return movement and thereby permit of the withdrawal of the pad 88 by the return movement of the frame 87 just before the complete or final closing of the folders. The orange is then carried forward with the folders in their closed position so as to cause the paper to become set so as to retain its crimped or folded position around the orange after which the rollers 81 pass from g. to h of the cams 82 and thereby quickly open the folders and permit the spring 15 to eject the orange into a suitable box or receptacle. Prior to the outward movement of the stem 13 and receptacle 7 to eject the orange in this manner the spring 107 that holds the roller 103 in engagement with the cam 102 causes the upper end of the stem 86 and the frame 87 to be swung back as shown by dotted lines in Fig. 6 out of the path of the ejected orange. As the wheel continues to revolve the stem 86 and frame 87 are held in this withdrawn position so that they can pass upwardly as shown in Fig. 1 without engaging with the sprocket 6 and plate 16. But just before the frame reaches the position in which the pad 88 is to be pressed down onto the orange as above described the cam 102 by its engagement with the roller 103 forces the stem back into its original position with the roller 95 in position for being engaged by the arm 96.

By means of the adjusting mechanism the machine can be readily adapted for oranges of different sizes and although I have described the machine as being especially adapted for use in wrapping oranges it is evident that it can be readily used for wrapping many other kinds of fruit or objects by properly adjusting the same.

By providing the printing mechanism each wrapper can be provided with any suitable advertising or other designating matter and the fruits can be quickly and successfully wrapped or inclosed in a neat and attractive manner. After the fruit has been discharged from the machine it can be packed in boxes in the usual manner and thereby properly prepared for market.

Having described my invention I claim:

1. In a wrapping machine, a frame, wrapping mechanism at one end and wrapper supplying mechanism at the other, a continuously moving carrier leading from the latter to the former mechanism and provided with reciprocatory stems, a cup like carrier on the outer end of each stem, and a spring for normally holding said cup and stem projected.

2. In a wrapping machine, a frame, wrapping mechanism at one end and wrapper supplying mechanism at the other, a continuously moving carrier leading from the latter to the former mechanism and provided with plate like members, each of said members being provided with a projection, a headed rod through each plate and its projection, a cup like receptacle at the outer end of said rod, and a spring bearing against said member at one end and against the receptacle at the other.

3. In a wrapping machine, a frame, wrapping mechanism at one end and wrapper supplying mechanism at the other, a continuously moving carrier leading from the latter to the former mechanism and comprising sprocket wheels and a sprocket chain mounted thereon, said chain being provided with plate like members, headed stems reciprocally mounted in said members, the outer end of each stem being provided with a receptacle, a spring for normally holding each stem and receptacle projected, means for feeding material to said receptacles, and a support for supporting the chain and receptacles after said material has been deposited in the receptacles.

4. In a wrapping machine, a frame, wrapping mechanism and wrapper supply mechanism thereon, a continuously moving carrier leading from the latter to the former mechanism, cup like yielding receptacles on said carrier, means supplying material to said receptacles provided with means for preventing said material from being shaken out of said receptacles after it has been deposited therein.

5. In a wrapping machine, a frame, wrapping mechanism and wrapper supplying mechanism thereon, a continuously moving carrier leading from the latter to the former mechanism, yielding receptacles on said carrier, means for feeding material to said receptacles provided with a series of substantially ring like members adapted to register with said receptacles and to be moved forward simultaneously therewith.

6. In a wrapping machine, a frame, wrapping mechanism and wrapper supplying mechanism thereon, a continuously moving carrier leading from the latter to the former mechanism, yielding receptacles on said carrier, a slotted supply spout above said receptacles, an endless belt provided with ring like members adapted to be moved into register with said receptacles, each ring being provided with fingers that pass through said slots and successively remove material from the spout into a position to permit of its being deposited in said receptacles.

7. In a wrapping machine, a frame, wrapping mechanism, wrapper supplying mechanism, a conveyer on the frame, a series of receptacles on the conveyer, said conveyer leading from the wrapper supplying mechanism to the wrapping mechanism, said wrapper supplying mechanism comprising means for supporting a roll of paper, and means for severing the same into wrappers and delivering the wrappers to the receptacles on the conveyer.

8. In a wrapping machine, a frame, wrapping mechanism, wrapper supplying mechanism, a conveyer on the frame, a series of receptacles on the conveyer, said conveyer leading from the wrapper supplying mechanism to the wrapping mechanism, said wrapper supplying mechanism comprising means for supporting a roll of paper, and reciprocatory means for severing the paper into wrappers and delivering the same to the receptacles on the conveyer.

9. In a wrapping machine, a frame, wrapping mechanism, a conveyer on the frame, pairs of shafts above the conveyer each provided with grooved wheels, the wheels upon one shaft of each pair being arranged farther apart than the wheels on the other shafts, and two pairs of belts over said wheels, a portion of the belts of each pair being arranged to travel in contact with their faces in two planes so as to engage with the wrappers yieldingly and carry them forward.

10. In a wrapping machine, a frame, wrapping mechanism thereon provided with reciprocatory folders, a conveyer provided with yielding receptacles, and means for forcing said receptacle and the material to be wrapped below the said folders, and means for releasing the receptacle after the material has been wrapped.

11. In a wrapping machine, a frame, wrapping mechanism thereon provided with a curved arm, a presser frame adapted to engage therewith, reciprocatory folders, a conveyer provided with yielding receptacles, means for forcing said receptacle and the material to be wrapped through said folders, means for holding the receptacle in its depressed position and for automatically releasing the same after the folders have completed their operation.

12. In a wrapping machine, a frame, wrapping mechanism thereon comprising reciprocatory folders, a conveyer provided with yielding receptacles, a spring pressed presser frame, means for actuating the presser frame to depress said receptacle and the material to be wrapped between said folders, means for retaining the receptacle in its depressed position after the presser frame has been returned to its normal position, and for releasing said receptacles.

13. In a wrapping machine, a frame, wrapping mechanism thereon comprising a reciprocatory spring pressed presser frame and folders, means for depressing the same and releasing it gradually, a conveyer provided with depressible spring pressed receptacles adapted to be forced between the folders by said presser frame, means for holding said receptacles in a depressed position, and for automatically releasing said receptacles to eject the material.

14. In a wrapping machine, a frame, sprocket wheels mounted thereon, one of which is provided with hollow spokes, a chain on said wheels provided with spring pressed stems adapted to be projected into said spokes, the outer end of each stem being provided with a receptacle, a presser frame for each spoke, means for depressing the presser frame, and thereby depressing said receptacle and stem, folders for wrapping the material means for holding the stem and receptacle depressed, and for releasing said stem and receptacle after the material has been wrapped.

15. In a wrapping machine, a frame, sprocket wheels mounted thereon, one of which is provided with hollow spokes and lugs, a chain over said wheels provided with spring pressed stems adapted to be forced into said spokes and each one provided with a receptacle at its outer end, a pair of arms pivotally secured to each spoke and adapted to fit between said lugs, folders in the free ends of said arms, means for depressing said stems into said spokes, means for actuating the folders during and after said stem has been depressed, means for locking the stems depressed, and for automatically releasing each stem after the material has been wrapped.

16. In a wrapping machine, a frame, a pair of sprocket wheels mounted thereon, one of which is provided with hollow spokes and ears, a pair of arms pivotally secured to each spoke, folders on the outer ends of said arms, a cam for engaging with each arm adjacent to its pivot point, a sprocket chain on said wheels provided with spring pressed depressible stems, means for forcing each stem into one of said spokes while the folders are being actuated, and for permitting said stems to resume their normal positions after the material has been wrapped.

17. In a wrapping machine, a frame, two sprocket wheels thereon, one of which is provided with hollow spokes and ears, a pair of arms pivotally secured to each spoke and adapted to fit between said ears, the outer ends of said arms being provided with folders, cams for actuating said arms, a sprocket chain on said wheels provided with stems adapted to be forced into said spokes, a spring finger for each arm provided with means for engaging with said stem and holding it depressed, means for depressing said stem, and for releasing the stem after the material has been wrapped.

18. In a wrapping machine, a frame, wrapping mechanism thereon comprising a wheel having lugs at its periphery, arms pivotally secured to the spokes of said wheel and adapted to fit between said ears, the outer ends of said arms being provided with folders, depressible material receptacles, a stem pivotally mounted to one of said ears, a depressible presser frame at the outer end of said stem, means for forcing the presser frame inward to depress said receptacle, and cams for actuating said arms and stem to throw said stem and presser frame laterally.

19. In a wrapping machine, means for supporting material, means for placing a wrapper around said material, and means for folding said wrapper comprising a pair of oppositely disposed fork members, said members being pivotally supported and curved substantially concentric with their pivots and means for moving the fork members toward each other to close the wrappers.

20. In a wrapping machine, means for placing a wrapper around the material, folding mechanism comprising two pairs of folding members, each pair comprising two parallel forks spaced apart and adapted to receive forks of the opposite pair, and means for moving the forks toward each other, said folding members being pivotally supported and said forks being curved substantially concentric with the pivot of the members.

In testimony whereof, I have hereunto set my hand at Los Angeles, California, this 27th day of June, 1908.

ELMER C. NORTHRUP.

In presence of—
  JOHN B. FEATHERSTONE,
  W. S. BOYD.